United States Patent [19]

MacFarlane

[11] 4,228,316
[45] Oct. 14, 1980

[54] HOLLOW POLE WITH INTERNAL WIRE GRIPPING AND SECURING MEANS

[75] Inventor: John H. T. MacFarlane, Middlesex, England

[73] Assignee: The Post Office, London, England

[21] Appl. No.: 947,954

[22] Filed: Oct. 2, 1978

[30] Foreign Application Priority Data

Oct. 4, 1977 [GB] United Kingdom ............... 41242/77

[51] Int. Cl.² ..................... H02G 7/20; F16G 11/00
[52] U.S. Cl. ............................. 174/45 R; 24/131 C; 52/40; 174/81; 174/DIG. 12
[58] Field of Search ............. 174/38, 40 R, 43, 44, 174/45 R, 81, 82, DIG. 12; 24/115 N, 129 C, 131 C; 52/40

[56] References Cited

U.S. PATENT DOCUMENTS

| 297,182 | 4/1884 | Shelbourne | 174/45 R |
| 750,782 | 1/1904 | Ramsey | 24/131 C X |
| 3,042,745 | 7/1962 | Williams | 24/131 C X |

FOREIGN PATENT DOCUMENTS

| 1440211 | 11/1968 | Fed. Rep. of Germany | 174/45 R |
| 1052142 | 9/1953 | France | 24/131 C |
| 187358 | 1/1964 | Sweden | 174/DIG. 12 |

Primary Examiner—Laramie E. Askin
Attorney, Agent, or Firm—Kemon & Estabrook

[57] ABSTRACT

A device for securing and anchoring a telephone wire comprises a narrow helix with widely spaced coils with an open bight at one end. The invention further comprises a telephone pole with an internal fixing element such as a ring with the device securing a wire looped onto it.

7 Claims, 6 Drawing Figures

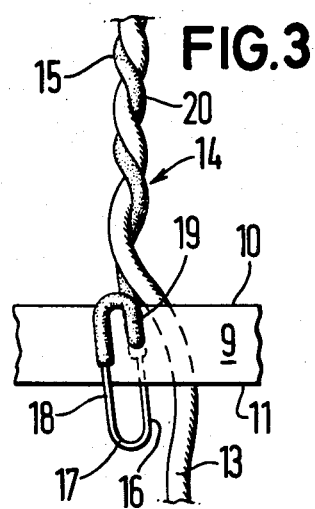
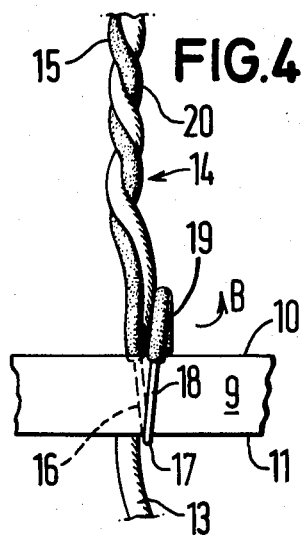
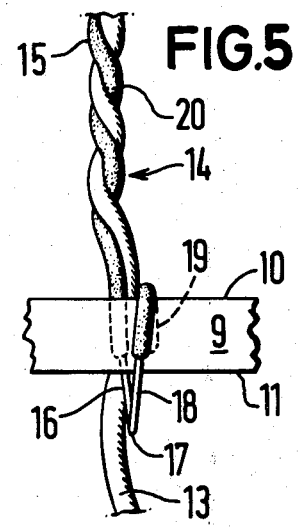

HOLLOW POLE WITH INTERNAL WIRE GRIPPING AND SECURING MEANS

DESCRIPTION

This invention relates to the securement of telephone wires in a hollow telephone pole. Solid poles are generally in use at the present and the hollow poles described hereinafter offer major advantages. They are light in weight and can be rigged from the ground using an access opening adjacent the base of the pole. In use the wires enter through the top of a hollow pole and extend downwardly through the pole to appropriate electrical terminations at the pole base. The objective of the present invention is to provide an improved securing and anchoring device which can secure a telephone wire and anchor it to the interior of the pole.

According to the present invention a device for securing and anchoring a telephone wire in a hollow telephone pole comprises a securing part in the form of a narrow helix with widely spaced coils and, at the end of the securing part, an anchoring part in the form of an open bight the free limb of which is formed out of the plane containing the main axis of the helix and the other limb of the bight, the free limb terminating in a re-entrant hook.

In use the wire end part depending in the pole is wrapped tightly around the securing part thereby frictionally securing the wire against longitudinal separation from the device. The bight of the anchoring part is looped around a fixing element in the pole. This fixing element can conveniently be a ring generally concentric with and secured to the interior of the pole. In use the inner surface of the bight abuts the lower surface of the ring or other element whilst the re-entrant hook at the end of the free limb of the bight can engage the upper surface of the ring or other element to prevent downward withdrawal and disengagement of the gripping device and the wire held thereby in normal usage or when an engineer is working in the interior of the pole.

A further advantage of the device of the present invention is that the open bight of the anchor device allows the device to be readily hooked onto the ring in the confined space available inside a hollow telephone pole.

Thus the present invention provides in a telephone pole the combination of the anchoring and gripping device set out above and a fixing element in the pole engageable by the bight and re-entrant of the anchoring part of the device.

Further the invention comprises a telephone pole with such fixing element and a telephone wire anchored by a device as set out above. In such a telephone pole there is advantageously included the following additional features:

(a) A capping member having a stem engageable with the upper open part of the pole and a flared throat defining rounded entry surfaces for telephone wires.

(b) A lid for the open end part of the pole hingedly connected to the capping member and selectively movable between an open and a closed position by one or more cables or lines passing through the interior of the pole to an access point at the base thereof.

The invention will now be described by way of example and with reference to the accompanying drawings wherein:

FIGS. 3, 4 and 5 are detailed views on a still larger scale showing the operation of a wire-securing and anchoring device in accordance with the present invention.

Figure 1:
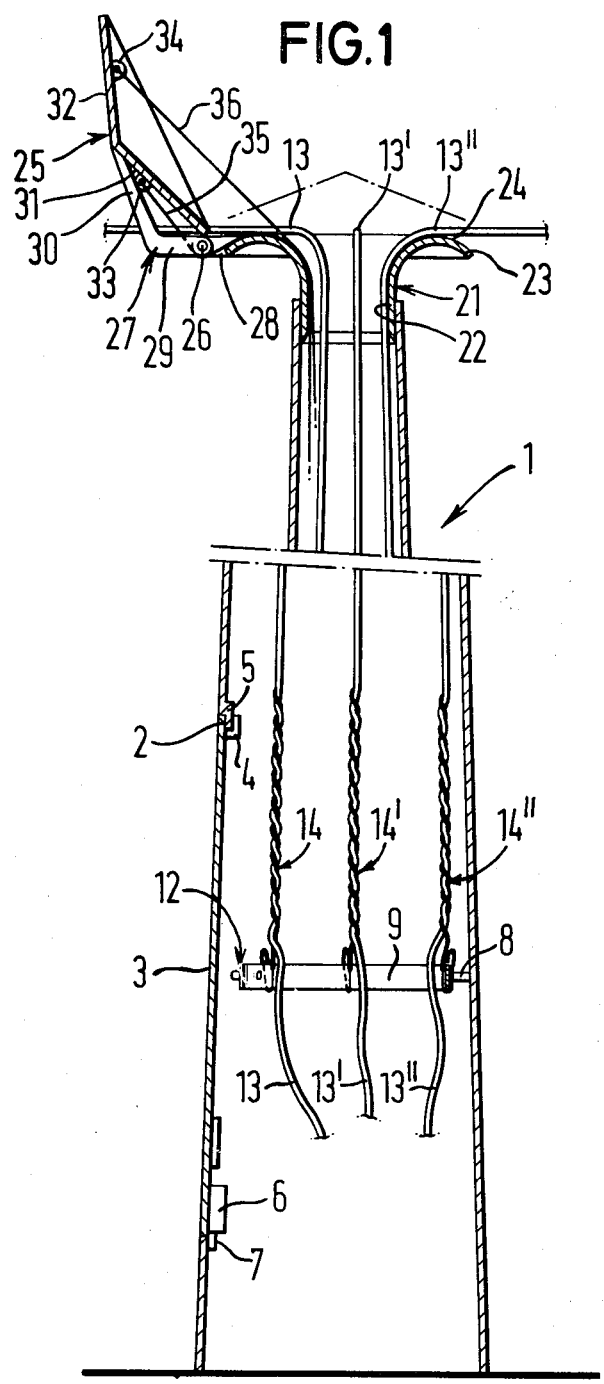
FIG. 1 is a sectional view showing the upper and lower part of a telephone pole with an assembly of components in accordance with the invention, the lower part being shown on an enlarged scale.
Figure 2:
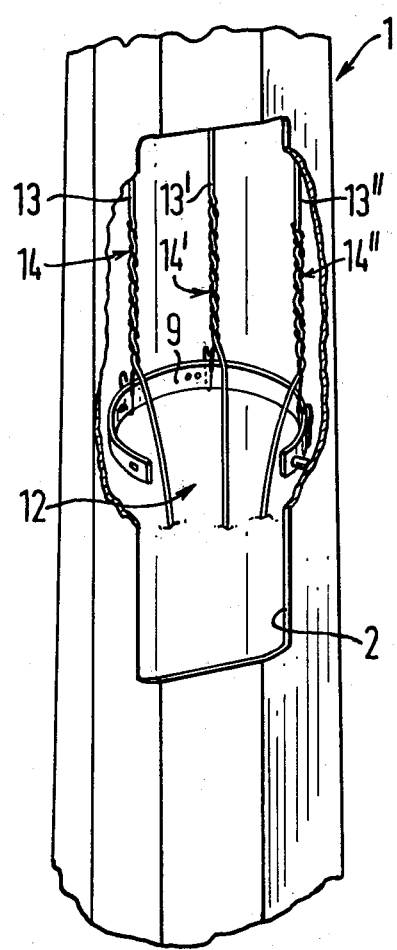
FIG. 2 is an enlarged perspective detail of the lower part of the pole.

Referring initially to FIG. 1 the telephone pole 1 illustrated is of hollow construction and may be formed from steel, resin reinforced with glass fibre or other appropriate rigid, weather proof and long lasting material. The lower part of the pole, as can best be seen in FIG. 2, has an access aperture 2. Returning to FIG. 1 the aperture 2 is closable by a removable door 3 having a slotted part 4 at the upper part for engagement with a dependent flange 5 on the pole body and a stop part 6 at the lower part for engagement with the stop 7 also on the pole body. An alternative door construction, not shown, comprises a sleeve member to fit the inner surface of the pole and rotatable about the pole axis. The inner sleeve has an aperture corresponding to aperture 2 and is rotatable between an open position wherein the apertures register and a closed position.

Secured to the wall of the inner surface of the pole diametrically opposite the aperture is a stud 8 carrying an anchor ring 9 formed of a strip of mild steel having upper and lower edge surfaces 10 and 11. The ring 9 is incomplete having a substantial opening 12 at the front thereof so as not to obstruct a person working through aperture 2. Telephone drop wires 13, 13' and 13" enter the upper end part of the pole 1 (to be described subsequently) and depend substantially vertically through the interior of the pole. The drop wire end parts are secured and anchored in the pole by devices 14, 14' and 14" in accordance with the present invention.

Each securing and anchoring device 14 is of unitary construction formed of relatively rigid but deformable round cross section wire having a securing section 15 and an anchoring section 16. The securing section 15 is formed into the widely spaced coils of a narrow helix, i.e. a helix whose internal diameter is only just above zero. The lower end part of the securing section 15 extends into the anchoring section or looped clasp 16 which is a bight 17, i.e. a substantially U-shape bend and free limb 18 of which extends upwardly in use. The free end of the limb 18 terminates in a re-entrant hook 19. The device has a plastic sheath 20 which is removed to leave bare wire in the region of the bight. It will be noted from FIGS. 4 and 5, particularly, of the drawings that the free limb 18 is bent out of the plane containing the main axis of the helix and the other limb of the bight.

In use to anchor and secure a drop wire 13, the wire is wound round tightly the turns of the helix and the bight 17 looped on to the anchor ring 9. The commencement of this looping-on operation is illustrated in FIG. 3. The spacing between the re-entrant part 19 and the plane referred to above is sufficient to allow entry on the ring but as the ring enters the bight and the spacing decreases, camming action between the ring and the bight causes the limb 18 and re-entrant hook portion 19 carried thereby to rotate in the direction of the arrow B in FIG. 4 to the position illustrated in FIG. 4 wherein the re-entrant hook portion 19 is immediately above the ring upper edge surface 10 with the ring ready to enter into the hook portion.

The operator then does the necessary work on the wire usually involving cutting and making a termination and during this work he may well pull the wire downwardly thereby causing the bight 16 to slip downwardly but in this event the re-entrant hook portion engages the upper abutment surface 10 of the ring preventing the disengagement of the device 14 and wire secured thereby which would otherwise occur. This condition is illustrated in FIG. 5 of the drawings. The bight can, moreover, slip downwardly in normal usage because of relaxation of tension in the wire.

Figure 6:
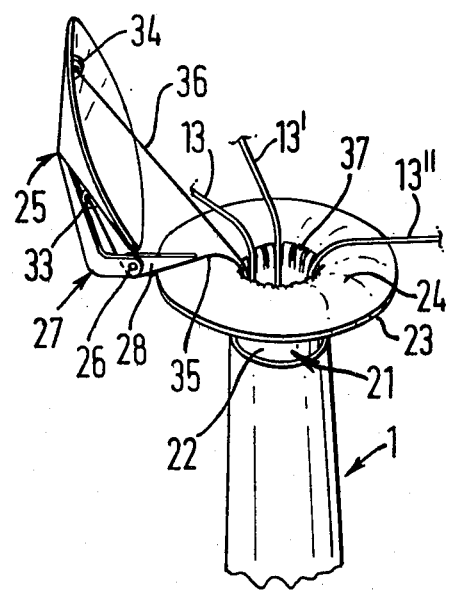
FIG. 6 is a perspective view showing the top of a pole with capping member and lid.

The remaining features of the assembly in accordance with the present invention will now be described. As can be seen in FIGS. 1 and 6 a capping member 21 usually made in one-piece from a plastic material comprises a cylindrical stem 22 adapted to fit the internal surface of the pole and a flared part 23 defining rounded entry surfaces 24 over which the wires 13 can be pulled without frictional damage. The flared part 23 is preferably provided with radial ribs 37 to provide a plurality of separate paths for wires and thus to keep adjacent wires apart.

The capping member has associated therewith a lid 25 closable to prevent the ingress of rain and snow during inclement weather and to prevent birds from nesting in the pole. The lid 25 is hingedly connected at 26 to a support element 27. The support member 27 has a first horizontally disposed part 29 having a locating slot 28 which receives an edge part of the capping member 21, and a rearwardly inclined upstanding part 30. The lid 25 is of gabled configuration having sloping side roofs 31 and 32 and hingedly connected to the part 30 about the horizontal hinge line 26. The lid has a first attachment loop 33 at the external surface of roof 31 and a second attachment loop 34 on the internal surface of the other roof 32. First and second ropes or lines 35 and 36 extending through the interior of the pole are attached to the loops 33 and 34. The lid 25 is illustrated in the open position; on pulling the second rope or line 36 the lid pivots about the hinge line to the closed position. From the said closed position pulling on the first rope or line 35 opens the lid by reverse hinging movement, the open position being limited by upstanding part 30.

I claim:

1. In combination, a hollow pole and means located internally thereof for securing and retaining an electric wire, said means comprising;

an annular anchor ring secured in concentric spaced relation to the inner wall surface of said hollow pole;

a unitary anchoring member consisting of an elongate helical section terminating in a looped clasp having a hooked end;

the diameter of said helical section being sized to receive and grip an electrical wire, and said hooked end engaging said anchoring ring for retaining a wire gripped by said helical section in said hollow pole.

2. The combination as described in claim 1 wherein said helical section constitutes a narrow helix with widely spaced coils terminating in an open bight having two limbs, one limb being a free limb positioned out of the plane containing the main axis of the helix and the other limb, said free limb terminating in said hooked end.

3. The combination as described in claim 1 wherein said hollow pole is provided with an access aperture in the lower portion thereof, a removable door positioned in said access aperture, and latching means on said door for securing same to said hollow pole.

4. The combination as described in claim 3 wherein a stud is mounted within said hollow pole opposite said access aperture, and said anchor ring is secured to said stud.

5. The combination as described in claim 4 wherin said anchor ring is formed with a gap adjacent said access aperture.

6. The combination as set forth in claim 1 wherein said hollow pole is provided with a capping member having a hollow stem portion engaged with the upper end of said hollow pole and a flared throat defining rounded entry surfaces for a wire.

7. The combination as set forth in claim 6 wherein said capping member is provided with a lid hingedly connected thereto, said lid being selectively movable between an open and a closed position, and lines positioned within said hollow pole for opening and closing said lid.

* * * * *